United States Patent [19]

Kitzner et al.

[11] 3,709,057
[45] Jan. 9, 1973

[54] ENERGY ABSORBING STEERING COLUMN ASSEMBLY

[75] Inventors: Ernest W. Kitzner, Allen Park; Alex Rhodes, Detroit, both of Mich.

[73] Assignee: Ford Motor Company, Dearborn, Mich.

[22] Filed: Aug. 5, 1971

[21] Appl. No.: 169,395

[52] U.S. Cl. .................................................. 74/492
[51] Int. Cl. .............................................. B62d 1/18
[58] Field of Search ............... 74/492, 493; 188/1 C

[56] References Cited

UNITED STATES PATENTS 3,392,599  7/1968  White ..................................... 74/492
3,459,063  8/1969  Numazawa ........................... 74/492

*Primary Examiner*—Milton Kaufman
*Assistant Examiner*—F. D. Shoemaker
*Attorney*—Keith L. Zerschling et al.

[57] ABSTRACT

An energy absorbing steering column having an outer tube secured to vehicle support structure. The tube rotatably supports a telescopic steering shaft. Spaced apart deforming and guiding assemblies connect the column tube to the support structure. The deforming assembly has projections which engage an enlarged forward end portion of the tube. The projections are constructed to plastically deform the tube upon axial displacement and, thereby, absorb the energy of an impact load. The forward end of the tube is enlarged to provide increased torsional rigidity between the tube and the deforming assembly during normal usage of the steering system. The guiding assembly includes a bushing that permits axial sliding displacement of the outer tube under the impact load.

11 Claims, 6 Drawing Figures

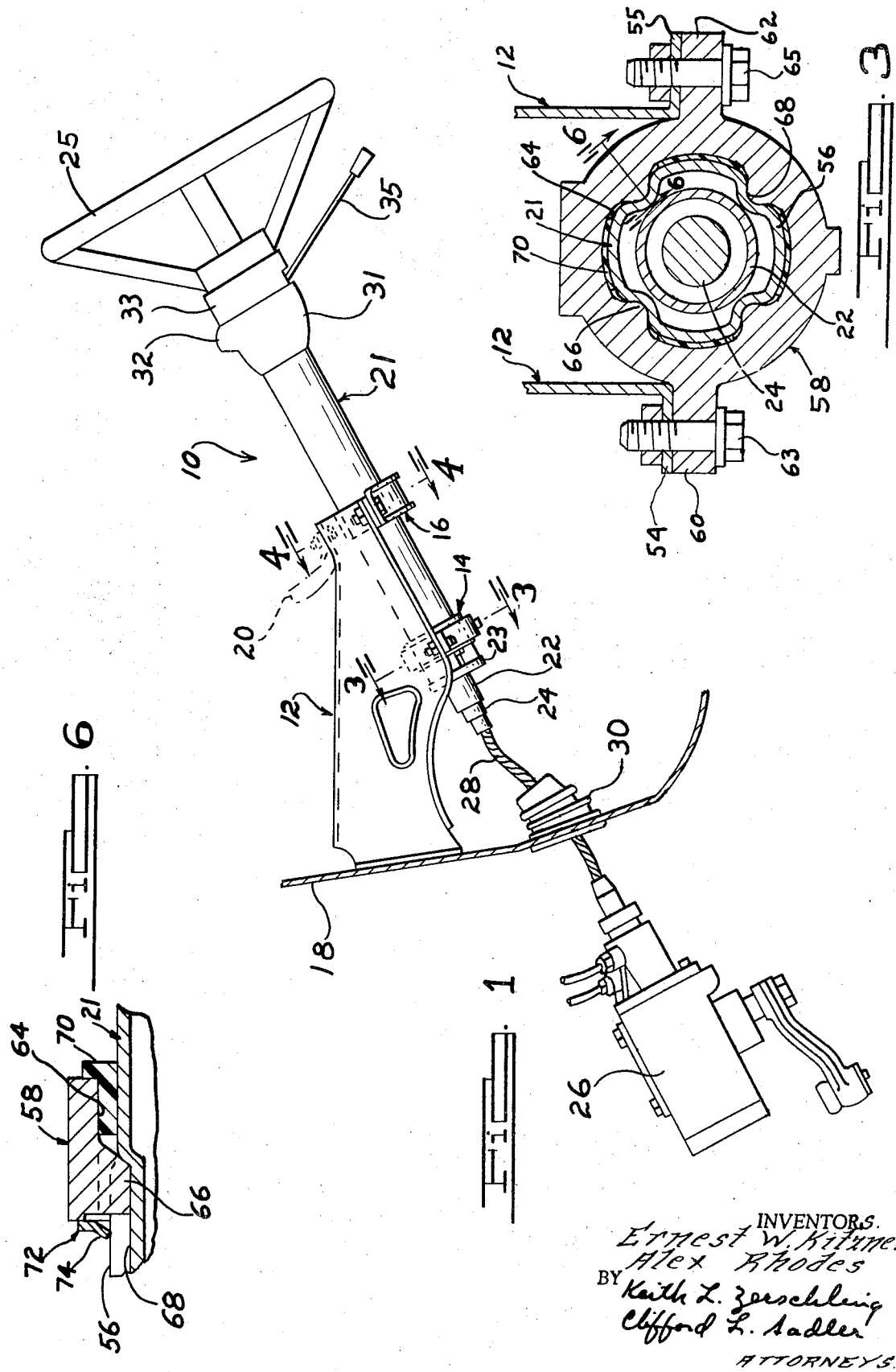

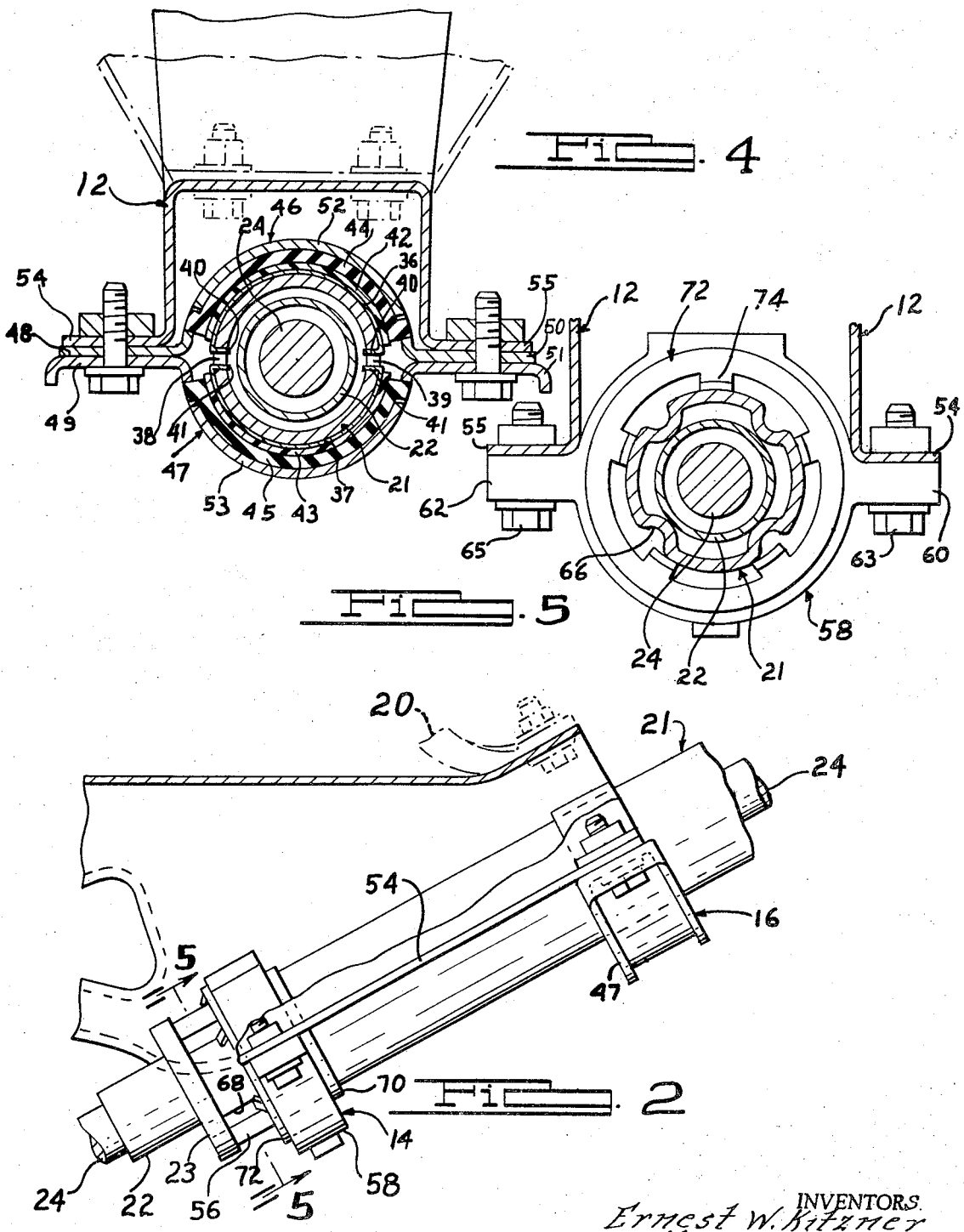

ENERGY ABSORBING STEERING COLUMN ASSEMBLY

BACKGROUND OF THE INVENTION

The present invention is particularly concerned with an energy absorbing steering column that is constructed to plastically deform at a controlled rate and, thereby, absorb an impact load upon the steering wheel. Certain prior art steering columns that are designed to absorb energy are objectionable because of their complexity. A steering column according to the present invention more than adequately performs the function of absorbing energy while being characterized by its simplicity of construction and economy of manufacture.

The present invention is an improvement to the invention disclosed in original application Ser. No. 863,137 filed Oct. 2, 1969, now abandoned, entitled ENERGY ABSORBING STEERING COLUMN ASSEMBLY and of which we are co-inventors. The invention of application Ser. No. 863,137 is now covered by continuation application Ser. No. 200,962 filed Nov. 11, 1971.

BRIEF SUMMARY OF THE INVENTION

The present invention provides, in one of its preferred embodiments, an energy absorbing steering column assembly having an outer tube that is supported on vehicle support structure by spaced apart fore and aft support assemblies. While both assemblies secure the column to the support structure during normal operation of the steering system, they may be characterized as a deforming assembly and as a guiding assembly, respectively in accordance with their function during steering column collapse under an impact load.

The lower forward support assembly includes a series of projections that extend radially inwardly into engagement with the tube. The forward end portion of the tube has an enlarged diameter in the region where it is engaged by the projections of the support assembly. The enlargement increases the torsional strength of the interconnection between the tube and the forward support during normal usage of the steering mechanism of which the steering column is a part.

The upper rearward support assembly includes a bushing that permits sliding axial displacement of the outer tube. This rear support structure includes a pair of semi-circular clips that engage the outer tube and a bushing with a low friction surface that engages the clips. The construction facilitates the guiding function of the rearward support during column collapse under an impact load.

The outer tube rotatably supports a steering shaft assembly which has a steering wheel connected to its rearward end and a steering gear to its forward end. When an impact load is imposed upon the steering wheel end of the steering column assembly, the outer tube is forced forwardly and downwardly. The tube slides through and is guided by the rearward support, but is plastically deformed by the projections of the forward support. The inwardly directed projections plow grooves axially along the tube. The plastic deformation of the metal of the tube absorbs the energy of the impact.

A steering column assembly in accordance with this invention is both reliable and economical to manufacture because the outer tube is relatively short and is of one-piece construction.

BRIEF DESCRIPTION OF THE DRAWINGS

The many objects and advantages of the present invention will become apparent upon consideration of the following detailed description and the accompanying drawings, in which:

FIG. 1 is a side elevational view of a steering column assembly installed in a motor vehicle and constructed in accordance with this invention;

FIG. 2 is an enlarged side elevational view of a portion of the column assembly of FIG. 1;

FIG. 3 is a sectional view taken along section line 3—3 of FIG. 1;

FIG. 4 is a sectional view taken along section line 4—4 of FIG. 1 and showing the unique slidable support for the column tube;

FIG. 5 is a sectional view taken along section line 5—5 of FIG. 2; and

FIG. 6 is a sectional view taken along section line 6—6 of FIG. 3 and showing the forward support with the projections engaging the enlarged forward end portion of the outer column tube.

DETAILED DESCRIPTION OF THE PREFERRED EMBODIMENT

Reference is now made to the accompanying drawings and the following detailed description, for a complete disclosure of the presently preferred embodiment of this invention.

In FIG. 1, a steering column assembly 10 is secured to a support bracket 12 by fore and aft spaced apart support assemblies 14 and 16. The support bracket 12 is secured to the fire wall 18 and to a portion of the upper dash or instrument panel structure 20 of a vehicle.

The fore and aft support assemblies 1 and 16 are constructed to support a tube 21 which constitutes the outer housing of the steering column assembly. A transmission shift tube 22 is rotatably supported within the outer tube 21, in part, by a bearing 23. A steering shaft assembly 24, in turn, is rotatably supported within the shift tube 22.

The steering column assembly 10 includes a steering wheel 25 that is situated at the upper end of the steering column and is affixed to the steering shaft assembly 24. The steering shaft 24 is connected at its lower end to a steering gear 26 by means of a flexible cable 28 that passes through an opening in the fire wall 18. A rubber boot 30 is positioned about the cable 28 to seal the opening in the fire wall 18 against the passage of dust into the passenger compartment.

The steering shaft assembly 24 within the outer tube 21 is of two-piece telescopic construction. The two shaft pieces are interconnected by frictional means or by shearable means that permit the two pieces to telescope under an axial load above a preset minimum.

A stationary lock support member 31 of generally annular construction is rigidly connected to the rearward end of the tube 21. The member 31 supports a steering column lock mechanism 32 that is constructed to selectively interconnect the steering shaft 24 and steering wheel 25 with the stationary member 31 to prevent their rotation.

Spaced rearwardly of the stationary lock support member 31 is rotatably mounted shift collar 33. A gear shift selector lever 35 is supported by the shift collar 33 and is connected to the upper end of the shift tube 22. The lower or forward end of the shift tube 22 is linked to the vehicle transmission so that the lever 35 may be manipulated by the vehicle operator in order to select a desired transmission gear ratio in a well-known manner.

Reference is now made to FIG. 4 of the drawings which discloses the construction of the rearward steering column support assembly 16. In accordance with this invention, the rearward assembly 16 functions as both a support and a slidable guide for the tube 21.

FIG. 4 discloses the steering shaft assembly 24, the shift tube 22 and the outer tube 21 positioned in concentric relationship. A pair of semi-circular metal clips 36 and 37 are fitted about the tube 21. Transversely aligned apertures 38 and 39 are formed in the tube 21. The clips 36 and 37 have inwardly directed tabs 40 and 41 at each of their ends which are fitted into the apertures 38 and 39. The interconnection between the tabs 40, 41 with the apertures 38, 39 prevents the axial displacement of the semi-circular clips 36, 37 with respect to the tube 21.

A pair of semi-circular low friction plastic members 42 and 43 are positioned on the outer surface of the semi-circular clips 36 and 37. The plastic members 42 and 43, which may be made of a material such as Teflon, are bonded to the inner surface of a pair of semi-circular rubber members 44 and 45.

A pair of clamp members 46 and 47 have radially outwardly extending mating flanges 48, 49 and 50, 51. The clamp members 46 and 47 have semi-circular midportions 52 and 53 which combine to form an annular clamp assembly that encircles the rubber members 44 and 45. Outwardly extending locating tabs are provided on the ends of the semi-circular rubber members 44, 45 which fit into appropriate openings in the portions 52, 53 of the clamp members 46, 47.

The support bracket 12 has laterally extending flanges 54 and 55 to which the mating flanges 48, 49 and 50, 51 are rigidly secured by bolts. The bolts draw the clamp member s 46 and 47 together to secure the clips 36, 37, the plastic members 42, 43 and the rubber members 44, 45 into a tight assembly about the outer column tube 21.

The rearward support structure 16 secures the steering column assembly 10 to the body structure 12 so as to prevent rattling, with the interposed rubber members 44 and 45 isolating noise and vibration from the vehicle body. In addition, the support assembly 16 is designed to function as a guide for the axial displacement of the tube 21 with nominal initial resistance when the tube is subject to an axial impact load.

The forward support assembly 14 adjacent to the lower or forward end portion 56 of the outer tube 21 is illustrated in FIG. 3 cross section. The outer tube 21 is surrounded by a rigid collar member 58 that has laterally extending arms 60 and 62. The lateral arms 60 and 62 are connected to the flanges 54 and 55 of the bracket 12 by means of bolts 63 and 65.

The collar 58 is of generally annular configuration and is provided with a central opening 64 through which the forward end portion 56 of the tube 21 is fitted. Four circumferentially spaced apart inwardly directed projections 66 are provided on the interior surface of the opening 64. The forward end portion 56 of the tube 21 is provided with a series of four axially extending grooves 68 in which the projections 66 are positioned with an interference or press fit.

The tube 21 is of substantially uniform diameter throughout its length except for the relatively short axial length of the forward end portion 56 which has a greater diameter. The grooves 68 in which the projections 66 are seated extend to the rearward limit of the large diameter portion 56.

An annular plastic bushing 70 is fitted about the upper end of the annular collar 58 as seen in FIG. 6. The bushing 70 is situated in the opening 64 of collar 58 and slidably engages the exterior of the tube 21.

A lock washer 72 is fitted about the tube 21 at its lower end adjacent to the rigid collar 58. As seen in FIGS. 2, 5 and 6, the washer or collar 72 has radially inwardly direct teeth 74 that bite into the exterior surface of the tube 21. The collar 72 serves to secure the tube 21 of the steering column assembly 10 from moving rearwardly with respect to the support structure 14 during normal operation.

OPERATION

The steering column assembly 10 is maintained in position by the engagement of the tube 21 with the fore and aft support assemblies 14 and 16. The grooves 68 extend for the relatively short axial length of the enlarged forward end portion 56 of the tube 21 and the projections 66 of the rigid collar 58 are seated in the grooves 68 adjacent to their rearward axial limit. This prevents inadvertent forward displacement of the tube 21 during normal operation. Similarly, the biting action of the teeth of 74 of the collar 72 prevents rearward displacement of the tube 21. As noted in FIGS. 4 and 6, the locking collar 72 is positioned against the support collar 58.

In the event a substantial impact load is imposed upon the steering wheel 25 in a lefthand direction as viewed in FIG. 1, the steering column assembly 10 will tend to move downwardly and forwardly through the fore and aft support assemblies 14 and 16. Due to the presence in the rearward support assembly 16 of the low friction plastic members 42 and 43, the support assembly 16 will provide limited initial resistance to displacement of the tube 21.

Forward axial movement of the steering column 10 will be resisted, however, by the forward support assembly 14. The inwardly extending projections 66 seated in the grooves 68 in the enlarged portion 56 will plow extensions of those grooves along the smaller diameter surface of the main body portion of the tube 21 as the assembly 10 moves forwardly. This plastic deformation of the outer tube 21 will resist displacement of the column assembly 10 and the energy of the impact will be absorbed.

The new grooves will appear as extensions of the preformed grooves 68 except for one distinctive feature. The newly plowed grooves will be of a lesser depth than the preformed grooves 68. This results from the fact that the forward end portion 56 has a larger diameter than the main body of the tube 21. The dual diameters of the tube 21 are dimensioned so that there will be a sufficiently rigid engagement between the grooves 68 and projections 66 during normal operation of the steering system to provide adequate torsional support whereas the depth of the shallow grooves plowed in the smaller diameter main body portion of the tube 21 will provide sufficient plastic deformation of the tube metal to absorb the desired level of energy.

The greater depth of grooves 68 is needed to provide the level of torsional rigidity which the tube support must provide when normal driving loads are placed upon the steering column 10 by the vehicle operator. This feature is particularly desirable in a steering column assembly having a steering column lock which is anchored to the outer column tube 21 and which must provide rigid resistance to angular movement of the steering wheel when the lock is engaged.

The rearward support assembly 16 permits the axial displacement of the tube 21 with limited initial resistance. Upon initial movement, the plastic members 42 and 43 will slide on the clips 36 and 37 which will be retained on the tube 21 by the tabs 40 and 41. After some additional movement, the plastic members 42 and 43 will be axially displaced from the clips 36 and 37 so that the plastic members 42, 43 will be spaced from the tube 21 by a dimension approximately equal to the thickness of the clips 36, 37. Thus, the rearward support 16 will provide a loose sliding support for the tube 21 during collapse under impact. This construction permits support 16 to guide the tube 21 as it moves through the forward support 14 with its deforming projections. The tube 21 will not bind in the supports 14, 16 while collapsing if it happens to be subjected to an impact load that is askew to the axis of the column 10.

In the event an impact should be imposed upon the steering gear 26 that will cause its rearward displacement, the cable 28 will flex. Flexing of the cable 28 will prevent the steering shaft 24 from being displaced rearwardly into the passenger compartment of the vehicle. In addition, the two-piece shaft assembly 24 is constructed to collapse.

It is particularly noteworthy that the outer tube 21 terminates adjacent to the lower bracket 14. The forward terminus of the tube 21 is spaced a substantial distance rearwardly of the fire walls 18. Unlike conventional prior art structures, the tube 21 does not extend through the fire wall 18. With this structure, substantial deformation of the fire wall 18 can occur in a rearward direction without encountering the steering column.

The present invention provides a superior energy absorbing steering column. The column is characterized by its simplicity in that the plowing of grooves by the inwardly extending projections 66 effective absorbs the energy of impact. In addition, the abbreviated length of the column adds toward the economy of manufacture.

The foregoing description presents the presently preferred embodiment of this invention. Modifications and alterations may occur to those skilled in the art which will come within the scope and spirit of the invention.

We claim:

1. An energy absorbing steering column for a motor vehicle comprising a support structure, an outer tube, means operatively connecting said tube to said support structure, said means comprising a first support assembly having deforming means engaging said tube, a second support assembly slidably engaging said tube, said first and second support assemblies being axially spaced apart and secured to said support structure, said deforming means being constructed to plastically deform said outer tube upon axial displacement of said tube with respect to said first assembly, said second support assembly including means constructed to reduce the sliding friction between said tube and said second support assembly only when said axial displacement of said tube exceeds a given minimum distance.

2. An energy absorbing steering column for a motor vehicle according to claim 1 and including:
means constructed to provide an increase in the effective diameter of said tube in the region of said second support assembly whereby clearance is provided between said tube and said second support assembly when said tube is axially displaced and said last mentioned means is displaced from said second support assembly.

3. An energy absorbing steering column for a motor vehicle according to claim 1 and including:
means constructed to provide an increase in the effective diameter of said tube in the region of said first support assembly, said just mentioned means being constructed to increase the torsional rigidity of the interconnection between said first support assembly and said tube.

4. An energy absorbing steering column for a motor vehicle according to claim 1 and including:
means constructed to provide an increase in the effective diameter of said tube in the region of said first support assembly, said just mentioned means being constructed to increase the torsional rigidity of the incterconnection between said first support assembly and said tube, and means constructed to provide an increase in the effective diameter of said tube in the region of said second support assembly whereby clearance is provided between said tube and said second support assembly when said tube is axially displaced and said last mentioned means is displaced from said second support assembly.

5. An energy absorbing steering column for a motor vehicle comprising a supporting structure, an outer tube, means connecting said tube to said support structure, said means comprising a first support assembly having deforming means engaging said tube, a second support assembly releasably supporting said tube, said first and second support assemblies being axially spaced apart and secured to said support structure, said deforming means being constructed to plastically deform said outer tube upon axial displacement of said tube with respect to said first support assembly, means constructed to provide an enlarged effective diameter portion of said tube in the region of said first support assembly, said last mentioned means being constructed to increase the torsional rigidity of the interconnection between said first support assembly and said tube.

6. An energy absorbing steering column according to claim 5 and including:
said deforming means comprising a plurality of circumferentially spaced apart inwardly directed projections.

7. An energy absorbing steering column according to claim 5 and including:

said deforming means comprising a plurality of circumferentially spaced apart inwardly directed projections, said tube having axially elongated grooves extending for substantially the entire length of that portion of said tube having an increase in effective diameter, said projections being seated in said grooves.

8. An energy absorbing steering column for a motor vehicle comprising a support structure, an outer tube, means connecting said tube to said support structure, said means comprising a first support assembly having deforming means engaging said tube, a second support assembly having means releasably engaging said tube, said first and second support assemblies being axially spaced apart and operatively secured to said support structure, said deforming means being constructed to plastically deform said outer tube upon axial displacement of said tube with respect to said first support assembly, means constructed to provide first and second enlarged effective diameter portions on said tube, said first and second portions being of relatively short axial length and juxtaposed said first and second support assemblies, said tube being of generally uniform smaller diameter at portions adjacent said first and second portions.

9. An energy absorbing steering column assembly for a motor vehicle comprising a support structure, an outer tube operatively connected to said support structure, a steering shaft rotatably supported within said outer tube, said shaft being adapted to be connected to a steering wheel at its rearward end to a steering gear at its forward end, steering column lock means mounted on said tube and having means to selectively rigidly interconnect said steering shaft and said tube, spaced apart first and second support means connecting said tube to said support structure, said first support means comprising a rigid annular member encircling said tube and secured to said support structure, said annular member having inwardly directed projections, said tube having axially extending grooves receiving said projections, said first support means being constructed to plastically deform said tube upon axial displacement thereof under the force of an impact load on the rearward end of said steering column assembly, said tube having an enlarged diameter portion in the region where it is engaged by said projections, said enlarged diameter portion being constructed to increase the torsional rigidity of the connection between said tube and said first support means for the effective operation of said steering column lock means.

10. An energy absorbing steering column assembly for a motor vehicle comprising a support structure, an outer tube operatively connected to said support structure, a steering shaft rotatably supported within said outer tube, said shaft being adapted to be connected to a steering wheel at its rearward end and to a steering gear at its forward end, spaced apart first and second support means connecting said tube to said support structure, said first means having deforming means engaging said tube and operatively secured to said support structure, said second means comprising clip means connected to said tube, said clip means having a relatively short axial length, said clip means being constructed to increase the effective diameter of said tube in the region of said second support means, bushing means operatively connected to said support structure, said bushing means having a surface slidably engaging said clip means, said bushing means including resilient means constructed to isolate vibration and limit its transmittal from said tube to said support structure, said first support means having means constructed to plastically deform said tube upon axial displacement thereof under the force of an impact load on the rearward end of said steering column assembly, said second support means being constructed to slidably support and guide said tube during said axial displacement.

11. An energy absorbing steering column assembly for a motor vehicle comprising a fire wall, a support structure situated rearwardly of said fire wall, means connecting said support structure to said fire wall, an outer steering column tube having its forward terminus spaced rearwardly of said fire wall, a deforming means and a releasable means connecting said tube to said support structure, said deforming means and said releasable means being axially spaced apart and spaced rearwardly of said fire wall, a steering shaft rotatably supported within said outer tube, said shaft being adapted to be connected to a steering wheel at its rearward end and to a steering gear at its forward end, said forward terminus of said outer tube being situated forwardly of said deforming means, said releasable means releasably engaging said outer tube and constructed to permit axial displacement of said outer tube relative to said support structure in response to the force of an impact load above a preset value, said deforming means being constructed to plastically deform said tube upon relative axial displacement of said tube with respect to said support structure and thereby absorb the energy of said impact load, said tube having a main body portion of substantially uniform diameter, first and second means providing axially spaced apart surface portions on said tube having larger effective diameters than said main body portion, said deforming means and said releasable means engaging said surface portions.

* * * * *